United States Patent [19]

Frazier et al.

[11] 3,791,257
[45] Feb. 12, 1974

[54] MACHINE TOOL TOOLING
[75] Inventors: James L. Frazier, Los Alamitos; Richard Polacek, Palos Verdes Peninsula, both of Calif.
[73] Assignee: Haudaille Industries, Inc., Buffalo, N.Y.
[22] Filed: Mar. 27, 1972
[21] Appl. No.: 238,198

[52] U.S. Cl. ............... 90/11 D, 90/11 A, 279/1 TS
[51] Int. Cl. ............................................. B23c 5/26
[58] Field of Search. 90/11 D, 11 A; 279/1 B, 1 TS; 408/239, 239 A; 29/26 A, 568

[56] References Cited
UNITED STATES PATENTS

| | | | |
|---|---|---|---|
| 3,678,801 | 7/1972 | Hague et al. | 90/11 D |
| 3,339,273 | 9/1967 | Knosp | 29/568 |
| 3,271,853 | 9/1966 | Pfister | 29/26 A |
| 3,323,419 | 6/1967 | Riedel | 408/239 A |
| 3,613,192 | 10/1971 | Tanabe et al. | 29/26 A |

Primary Examiner—Travis S. McGehee
Assistant Examiner—Z. R. Bilinsky
Attorney, Agent, or Firm—Hill, Sherman, Meroni, Gross & Simpson

[57] ABSTRACT

A machine tool includes a rotatably driven axially movable spindle body having an axial opening terminating in a tool socket, a tool or tool adapter having a shank of corresponding configuration disposed in said tool socket, the shank having an axially opening clamping socket with overhanging shoulder means partially closing the clamping socket, and axially driven clamping means reciprocable in the axial opening of the spindle, and extending into the sockets, the clamping means having a hook portion engageable with the shoulder means in an axial direction within said clamping socket. The tool or tool adapter of itself constitutes an article of commerce which includes a pair of axially spaced circumferential flanges with at least one axially extending slot therethrough, the flanges jointly defining a groove therebetween, the diameter of the shank tapering smaller away from the flanges at one side of the flanges and the diameter being cylindrical at the other side thereof. The axially driven clamping means includes two pivotable clamping members that are positively pivoted to their tool-clamping and tool-releasing positions.

5 Claims, 2 Drawing Figures

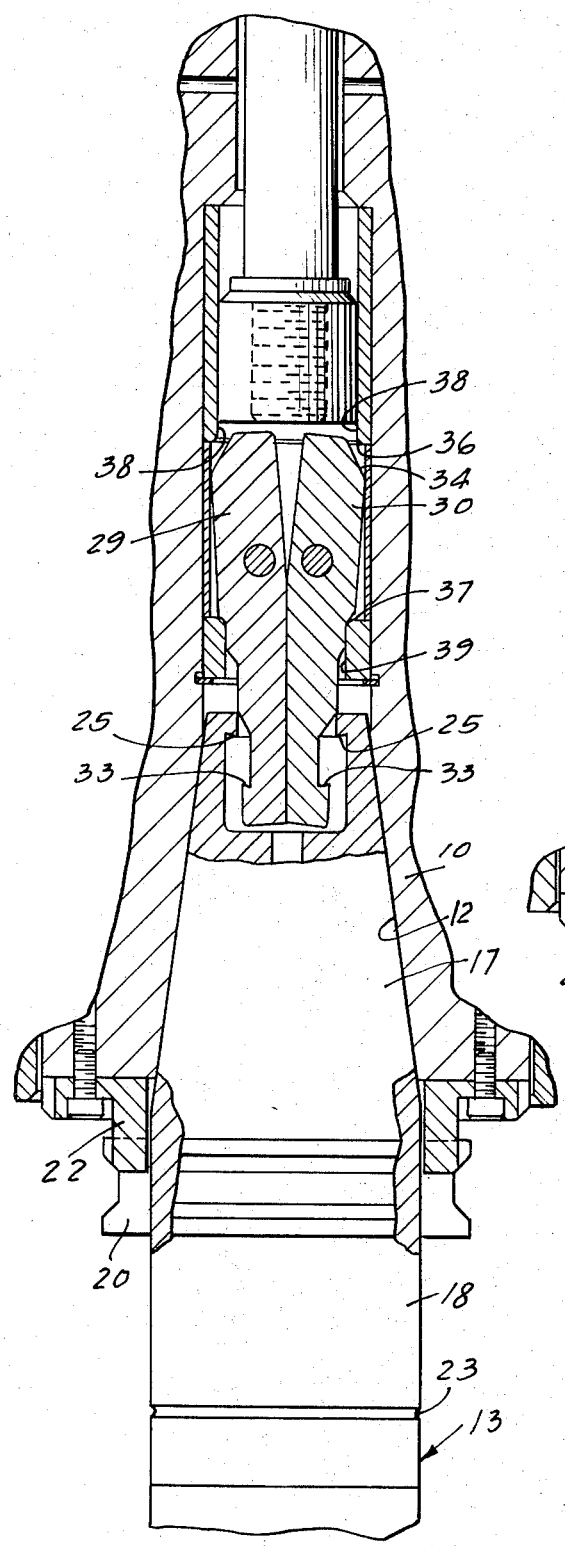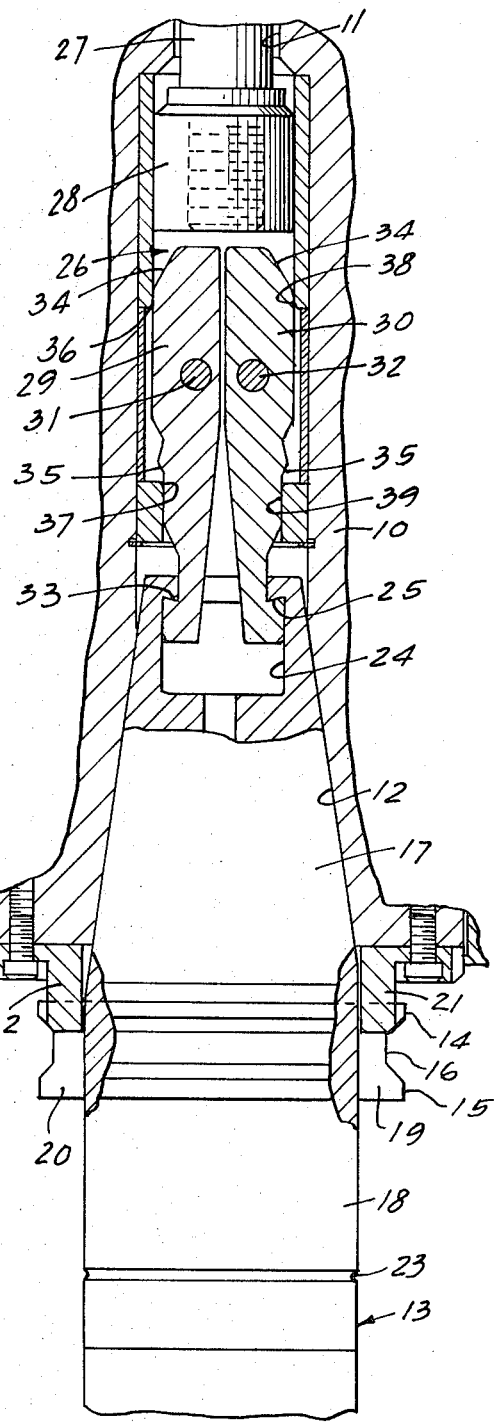

MACHINE TOOL TOOLING

BACKGROUND OF THE INVENTION

1. Field of the Invention

This invention relates to tooling for machine tools and more specifically to the shank of a tool or tool adapter.

2. Prior Art

It has been known heretofore to provide a machine tool spindle with a construction that enables tooling, such as a chuck, to be attached thereto. As the need for more rapid tool change has arisen, various types of quick change tool holder have been provided. For instance, it has been known to provide a tapered female adapter which is secured by threads to the spindle, so that the adapter can receive a tool or tool holder having a tapered shank. Such adapters are normally externally manually actuated to release the tool or tool holder. Examples of such devices are shown in U.S. Pat. Nos. 2,719,722, 3,396,981 and 3,498,624.

SUMMARY OF THE INVENTION

According to this invention, a machine tool spindle is provided which avoids the use of the intermediate adapter and enables the tool or tool holder to be secured directly into the machine tool spindle without any intermediate tooling and still retaining the quick changeability. However, in the present invention, the quick changeability is mechanically obtained thus avoiding the use of manual actuation of the adapter.

Thus, according to this invention, there is provided a tool or tool adapter that has a shank which has an axially open clamping socket with overhanging shoulder means partially closing the clamping socket, the clamping socket being at the samller end of a tapered portion disposed at one side of circumferential flanges, there being a cylindrical portion at the other side of such flanges. The tapered portion is received in a tool socket in a spindle body which contains axially driven clamping means having a hook portion engageable with the shoulder in an axial direction within the clamping socket.

Accordingly, it is an object of the present invention to provide a tool or tool adapter which can readily be clamped in and released from a machine tool spindle.

A further object of the present invention is to provide a tool or tool adapter that is particularly useful in a machine tool provided with an automatic tool changer.

A further object of the present invention is to provide a machine tool which has readily changeable tooling.

Many other advantages, features and additional objects of the present invention will become manifest to those versed in the art upon making reference to the detailed description and the accompanying drawings in which a preferred structural embodiment incorporating the principles of the present invention is shown by way of illustrative example.

ON THE DRAWINGS:

FIG. 1 is a cross sectional view of a spindle and tool or tool adapter showing the tooling in the clamped position; and FIG. 2 is a view corresponding to FIG. 1 showing the tooling in an unclamped or released condition.

AS SHOWN ON THE DRAWINGS:

The principles of the present invention are particulary useful when embodied in a machine tool having a spindle body 10. The spindle is rotatably driven and is axially movable and has an axial bore or opening 11 terminating at its lower end in an enlarged tool socket 12 which tapers to a larger size at its lower end.

Received in the tool socket 12 is a tool or tool adapter 13 which has a pair of circumferential flanges 14, 15 defining a groove 16 therebetween. The tool 13 has a shank that extends in opposite directions from the flanges 14,15, at the upper side as shown, the shank being a tapered portion 17 which is tapered the same as the tool socket 12 so as to fit snugly therein. At the opposite side of the flanges 14,15, the shank includes a cylindrical portion 18 by which the tool 13 may be held in a tool storage device. The groove 16 between the flanges 14,15 provides a structure by which the tool may be grasped by fingers of an automatic tool changer. The flanges 14,15 have at least one slot 19 therethrough, and preferably a second slot 20 which respectively receive the lower end of a lug 21,22, the lugs 21,22 being secured by screws to the lower end of the spindle body 10. The lugs 21,22 are disposed radially eccentric to the spindle body 10 and thus provide positive angular driving forces to the tool 13. If desired, a groove 23 is provided to serve as an indicator, for example to show that the tool is in a proper position in a tool storage device if the groove 23 shows.

The tool or tool adapter 13 has an axially opening clamping socket 24 with overhanging shoulder means 25 which partially closes the entrance or opening to such socket 24.

Within the bore 11, there is provided axially driven clamping means generally indicated at 26, the clamping means being reciprocable in the axial opening 11 of the spindle body 10. To that end, a reciprocably driven actuating rod 27 is threaded onto a support member 28 which has a split lower end within which there is disposed a pair of clamping members 29,30, respectively having mounting pins 31,32 by which the clamping members 29,30 may pivot. The clamping members 29,30 project into the socket 12 and also into the socket 24 and are each provided with a hook portion 33 for engaging the shoulder means 25 in an axial direction within the clamping socket 24. There is at least one such clamping member 29 and preferably two such members 29,30 as shown. Each clamping member 29,30 has a pair of cam surfaces 34,35 disposed at opposite sides of its pivotal axis or mounting pin 31,32. Within the spindle body 10, there is provided a pair of axially spaced abutments 36,37 which are alternatively engaged by the cam surfaces 34,35 in response to being axially reciprocated, and such engagement of the cam surfaces 34,35 causes the clamping members 29,30 to be moved between tool-clamping and tool-releasing positions. Adjacent to the abutment 36 and just above it, there is provided a locking surface 38, and below the lower abutment 37 there is provided a further locking surface 39. The upper locking surface 38 is engaged by the clamping member 29,30 just after the cam surface 34 has moved past the abutment 36, thus locking the clamping member 29,30 in a tool-clamping position as shown in FIG. 1. The lower locking surface 39 is engaged by the clamping members 29,30 below their pivotal axes just after the lower cam surface 35 has moved past the lower abutment 37, thereby locking the clamping members 29,30 in a tool-releasing position as shown in FIG. 2. The engaged locking surface 38 is disengaged just before cam surface 35 engages the abutment 37 to permit the clamping members to pivot from their pivotal position shown in FIG. 1 to their pivotal position shown in FIG. 2, and the locking surface 39 is disengaged just before the cam surface 34 engages the abutment 36 to enable the clamping members 29,30 to pivot from the position shown in FIG. 2 to that shown in FIG. 1.

The tool or tool adapter 13 is particularly useful in combination with the other structure illustrated, but there are other spindle structures with which the tool or tool adapter 13 can be utilized. When the tool or tool adapter 13 is utilized as shown and explained, all that needs to be done to release a tool is to shift the clamping means 26 downwardly from the FIG. 1 position to the FIG. 2 position, and then the tool 13 is free to drop out. Once the tool 13 is out, it may be replaced by one having a different cutting size or nature by placing it by hand or by a tool changer in the spindle body 10 as shown in FIG. 1, after which the clamping means 26 is raised to cause the hook portions 33 of the clamping means 26 to engage the tool or tool adapter shoulder 25 as shown in FIG. 1. In actual usage, there would be a substantial number of tools or tool adapters 13, and therefore the tool or tool adapter 13 is a separate article of commerce that is sold not only in the combination illustrated, but as a single entity, as for use in the combination.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A machine tool, comprising:
   a. a rotatably-drivable axially movable spindle body having an axial opening terminating in a tapered tool socket;
   b. a tool having a shank with a corresponding tapered portion received in said tapered tool socket, said shank having an axially opening clamping socket with overhanging shoulder means partially closing said clamping socket;
   c. a reciprocably driven actuating rod disposed in the axial opening in said spindle body;
   d. a pair of axially spaced abutments secured to the interior of said spindle body; and
   e. at least one clamping member pivoted on said actuating rod, said clamping member having a hook portion extending into both of said sockets, said hook portion being engageable with the inner side of said shoulder means in an axial direction, said clamping member having a pair of vertically-spaced radially outwardly facing cam surfaces disposed at opposite sides of its pivotal axis, the upper of said cam surfaces being engageable with the upper of said abutments to effect clamping of the tool in response to upward movement of said actuating rod and the lower of said cam surfaces being engageable with the lower of said abutments to effect unclamping of the tool in response to the downward movement of said actuating rod.

2. A machine tool according to claim 1 in which said shank has a cylindrical portion at the side of said flanges away from said sockets.

3. A machine tool according to claim 1 including a pair of locking surfaces in said spindle body disposed respectively above said upper abutment and below said lower abutment for holding clamping member in said tool-clamping and tool-releasing positions.

4. A vertical tool according to claim 1 in which said shank has a pair of axially spaced circumferential flanges jointly defining a groove therebetween and disposed adjacent to the tapered portion, there being at least one axially directed slot intersecting said groove; and at least one radially offset lug drivably secured to and projecting axially from the end of the spindle body into said slot.

5. A machine tool according to claim 1 in which said shank has a cylindrical portion by which the tool may be held in a tool storage device.

* * * * *